Feb. 8, 1938.  A. H. COHN  2,107,748
ORNAMENTAL PRODUCT
Filed July 15, 1937  2 Sheets-Sheet 1

Adolph H. Cohn
INVENTOR.
BY Wm. S. Pritchard
ATTORNEY.

Feb. 8, 1938.   A. H. COHN   2,107,748
ORNAMENTAL PRODUCT
Filed July 15, 1937   2 Sheets-Sheet 2
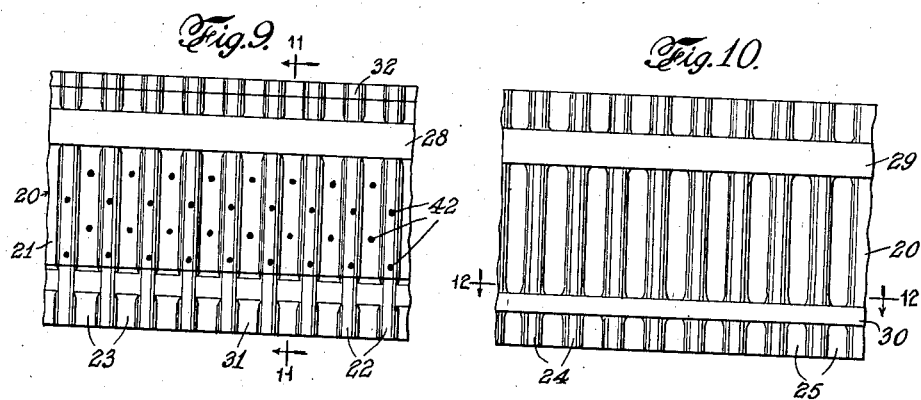
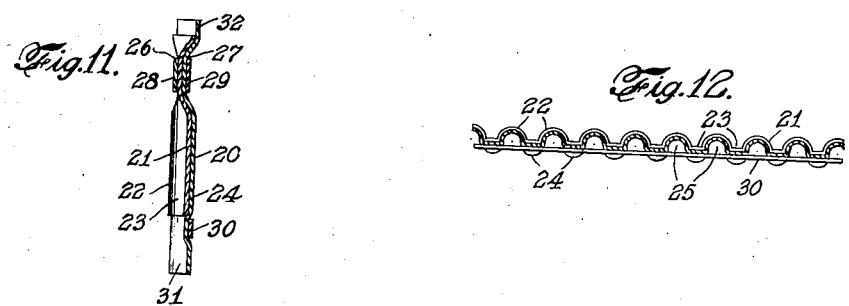
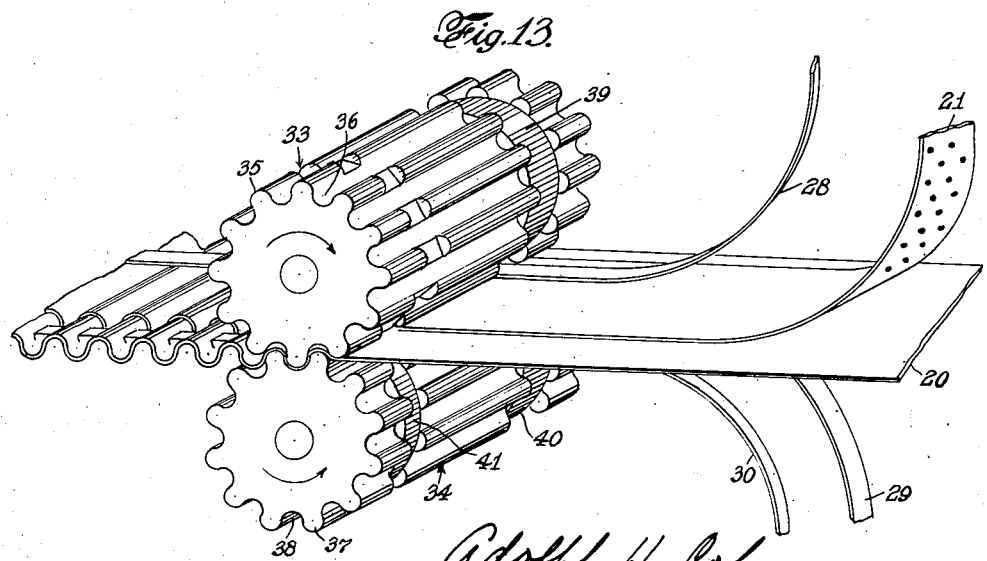
Adolph H. Cohn INVENTOR.
BY Wm. S. Pritchard
ATTORNEY.

Patented Feb. 8, 1938

2,107,748

UNITED STATES PATENT OFFICE 2,107,748

ORNAMENTAL PRODUCT

Adolph H. Cohn, New York, N. Y., assignor, by mesne assignments, to Edward Karfiol, Great Neck, N. Y., and Louis A. Voltter, New York, N. Y.

Application July 15, 1937, Serial No. 153,700

12 Claims. (Cl. 41—10)

This invention relates to an ornamental article of manufacture. More particularly, it relates to an ornamental pleated material, particularly designed for use as an artistic edging for shelves.

The nature and objects of the invention will become apparent from the following description, appended claims and accompanying drawings forming a part of this specification and wherein several illustrative embodiments of the invention are illustrated and in which:

Figures 9 and 10 are front and rear views respectively of still another embodiment of the invention;

Figure 11 is a section taken on the line 11—11 of Figure 9;

Figure 12 is a section taken on lines 12—12 of Figure 10; and

Figure 13 is a perspective view showing an illustrative apparatus for carrying out the process for producing the article illustrated in Figures 9—10 inclusive.

Figure 1:
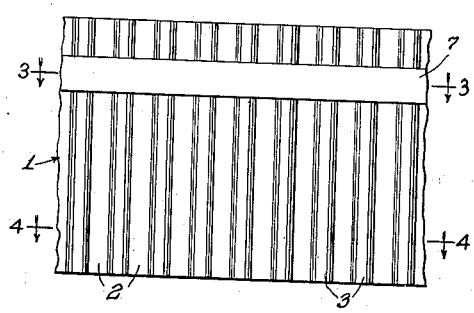
Figure 1 is a front view of one embodiment of an edging for shelves produced in accordance with the principles of this invention.
Figure 2:
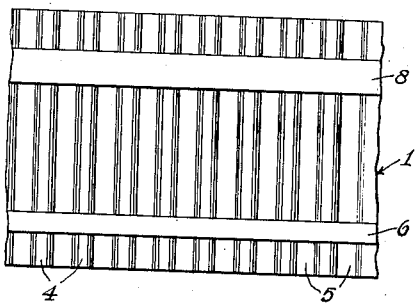
Figure 2 is a rear view of the material illustrated in Figure 1.
Figure 3:
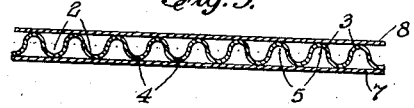
Figure 3 is a section taken on the line 3—3 of Figure 1.
Figure 4:
Figure 4 is a section taken on line 4—4 of Figure 1.
Figure 5:
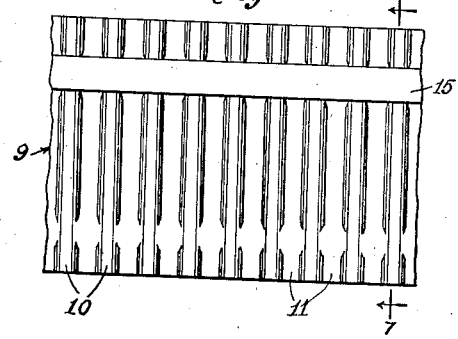
Figures 5 and 6 are front and rear views respectively of another embodiment of the invention.
Figure 6:
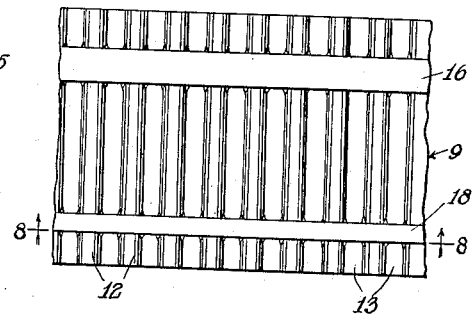
Figure 7:
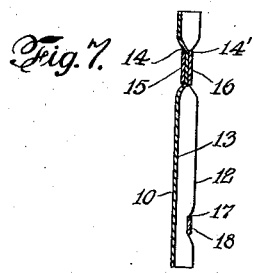
Figure 7 is a section taken on the line 7—7 of Figure 5.

For brevity and illustrative purposes only, the invention hereinafter will be described specifically in connection with the preferred embodiment thereof, i. e. an edging for shelves. It is, however, to be understood that the invention and principles thereof are not restricted to edgings for shelves since, as will become apparent, they are equally applicable to other ornamental products utilizing pleated materials.

The expression "pleated" or equivalent expression is used herein to describe broadly the various forms of pleats, i. e. corrugated, fluted, box-pleated, side-pleated, bias-pleated, pattern-pleated, combination-pleated, shirred, etc.

In using edging for shelves of pleated materials, such as, for example, paper, I have found that there is a tendency for the pleats, particularly adjacent the free edges thereof, to open and lose their original shape and form. As a consequence, the pleated material flares out producing an unattractive product.

The instant invention contemplates overcoming the aforementioned undesirable results.

In accordance with the principles of this invention, a strip of paper of a width depending on the width desired in the product is pleated, i. e. corrugated, fluted, box-pleated, side-pleated, bias-pleated, pattern-pleated, combination-pleated or shirred, and the pleated paper is provided with means to retain the pleats substantially permanent in shape and produce a highly ornamental product. In the preferred form of the invention, the pleat-retaining means is provided on the back or rear face of the product in such a manner that the form and shape of the pleats on the front face are not appreciably affected.

The pleat-retaining means is usually a strip of appropriate material secured, preferably adhesively, to the pleated material at the desired place. When the paper is fluted or corrugated, the pleat-retaining strip is adhesively secured to the apices of the ridges on the back of the pleated paper, whereby the form and shape of the pleats on the front of the pleated paper are not substantially changed or appreciably affected. When it is desired to provide stronger means for retaining the corrugations in shape, the invention contemplates providing a groove or depression transversely of the corrugations and adhesively securing therein the pleat-retaining strip. This form of the invention is particularly suitable when the paper is provided with corrugations or flutings having alternate ridges and furrows on both sides thereof, the ridges and furrows on one side being opposite the ridges and furrows on the other side. With such a material the ridges on one side are flattened or depressed sufficiently to form a groove extending transversely of said ridges without appreciably affecting the ridges on the other side.

The paper constituting the pleated paper is of such stock as will permit it to take pleats without crushing and may be plain or decorated. It may be attractively colored as, for example, by having a dye or pigment incorporated therein, or it may be coated with any desired coating composition. The paper may be decorated on predetermined areas thereof and with any desired design obtained, for example, by printing. The paper may also be provided with a scalloped or other attractive edge.

When a more highly decorated product is desired, the invention also contemplates adhesively securing or laminating to the paper a decorated material such as printed, coated or colored material of a contrasting color to the paper base, and extending over the entire or part of the surface, as desired.

Obviously, any of the aforementioned means of enhancing the appearance of the product may be used conjointly, as desired.

Referring now to the drawings, and particularly Figures 1, 2, 3, and 4, the reference numeral 1 designates a paper which has been corrugated or fluted and thereby provided on the front face thereof with alternate furrows 2 and ridges 3. On the rear surface the paper material is also provided with alternate ridges 4 and furrows 5. It is to be noted that the furrows 2 are directly opposite the ridges 4 and the ridges 3 are opposite the furrows 5. In order to secure and retain the pleats permanently in shape, a narrow strip 6 of any suitable material such as, for example, paper is adhesively secured to the rear face of the pleated paper 1. It is to be noted that the strip 6 contacts only with the ridges 4 and bridges the furrows 5. In other words, the strip 6 is adhesively secured to the ridges 4 only. As a consequence, the furrows 2 and ridges 3 of the product are in no wise appreciably or substantially affected or distorted when the pleat-retaining strip 6 is adhesively secured as described.

Any number of pleat-retaining strips 6 may be used, though usually one disposed near or adjacent each free edge of the material is sufficient.

In the embodiment illustrated in Figures 1–4, the strip 6 is on the rear (non-visible) surface of the product with the result that there is no appreciable effect on or distortion of the corrugations on the front (visible) surface of the product.

Though the pleat-retaining strip 6 has been described as being on the back (non-visible side) of the product, it may be on the front (visible side) of the product. In such a case it is preferably colored and/or decorated and of an appearance contrasting with the pleated paper 1.

The edging is provided with an area extending transversely and adjacent the top thereof which is adapted to receive adhesives, tacks or nails, whereby the edging may be secured to the shelf. In the form shown in Figures 1–4 inclusive, two strips 7 and 8, similar to the strip 6, may be secured opposite each other on the front and back surface of the material and adjacent the top to provide an area extending transversely of the edging and to provide an area to receive adhesives, tacks or nails, whereby the edging may be secured to the shelf. It is to be noted that strip 7 is adhesively secured to the ridges 4 and bridges the furrows 5 while the strip 8 is adhesively secured to the ridges 3 and bridges the furrows 2. Incidentally, the strips 7 and 8 also serve to retain the pleats in shape.

The edging of Figures 1–4 is highly satisfactory when secured by an adhesive to the shelf. When secured to the shelf by means of tacks, nails, etc., the pleats may be somewhat crushed. The invention, therefore, also contemplates providing an area through which tacks, nails, etc. may be driven to secure the edging to the shelf without crushing the pleats. Such a construction is shown in connection with Figures 5–8 inclusive, and it is to be understood that this construction may be used in place and stead of that of Figures 1–4 inclusive.

Referring now to Figures 5–8 inclusive whereIn another illustrative embodiment of the invention is illustrated, a paper strip 9 of the desired width is corrugated so that it is provided on the front face thereof with alternate ridges 10 and furrows 11 and also on the rear face with alternate ridges 12 and furrows 13. The ridges 10 are opposite the furrows 13 and the furrows 11 are opposite the ridges 12. The paper 9 is so corrugated that in the upper portion or adjacent the top thereof there is a narrow area extending transversely of the paper which is not corrugated and which in the finished product constitutes oppositely disposed grooves or depressions 14 and 14', one on each side thereof, and in which strips 15 and 16 are adhesively secured (see Figure 7). Tacks, nails, etc. may be driven into this area and the pleats will in no wise be damaged or affected. Usually, the width of the grooves 14 and 14' and the strips 15 and 16 are such as to accommodate the usual heads of tacks or nails.

Figure 8:
Figure 8 is a section taken on line 8—8 of Figure 6.

Figures 5–8 inclusive also illustrate and show the preferred embodiment of the invention relating to the disposition of the pleat-retaining means. According to this embodiment of the invention, the rear face of the material, which is to constitute the non-visible portion of the product when in use, is so corrugated that the ridges 12 on the rear face are depressed or flattened sufficiently to constitute a groove 17 extending transversely of the material in which a pleat-retaining strip 18 is adhesively secured. It is to be noted that the apex of each ridge 12 is depressed or flattened, the extent of the depression or flattening being such that it can receive the pleat-retaining strip 18 and not appreciably affect the shape and appearance of the pleats on the opposite face of the material. It is to be also noted that the strip 18 is adhesively secured to and in contact with the flat apices of the ridges 12, as shown in Figure 8, and extends over or bridges the furrows 13.

When a more decorative material than is illustrated in Figures 1–8 inclusive is desired, this is obtained preferably by securing or laminating to the front surface of the paper a decorative material, such as a strip of a transparent material, for example regenerated cellulose, whereby the product will be given a high luster and sheen. The regenerated cellulose may be decorated and/or colored and/or printed in a manner contrasting with the paper. For reasons which will become apparent, the regenerated cellulose is decorated on that surface which contacts with the paper. In the preferred form of this embodiment of the invention, the material is adhesively secured to the paper through the medium of the decorating, coloring or printing composition. Such an embodiment of the invention is illustrated in Figures 9–12 inclusive.

Referring now to Figures 9–12 inclusive, a paper strip 20 of the desired width, together with a tape of regenerated cellulose 21, are provided with corrugations so that the composite material is provided on the front face thereof with alternate ridges 22 and furrows 23 and on the rear face with alternate ridges 24 and furrows 25. The ridges 22 are opposite the furrows 25, and the furrows 23 are opposite the ridges 24. The composite material is so corrugated that on the upper portion or adjacent the top thereof there are narrow areas on each side thereof extending transversely of the material which is not corrugated and which in the finished product constitutes oppositely disposed grooves or depressions 26 and 27 (similar to the grooves or depressions 14 and 14' of Figure 7), and in which strips 28 and 29 are adhesively secured. The apex of each ridge 24 is depressed or flattened similarly to that of ridges 12. A pleat-retaining strip 30 is adhesively secured in contact with the flat apices of the ridges 24 and extends over or bridges the furrows 25.

The regenerated cellulose strip may be of the same width as the paper 20, in which case it will be coextensive with the paper, and the entire front surface of the article will possess a very attractive lustrous appearance. Alternatively, the regenerated cellulose strip may be of a width narrower than the paper, in which case the paper 20 will extend beyond the regenerated cellulose strip, and the extension of the paper will form a contrasting margin as illustrated by the reference numerals 31 and 32 respectively. Though the upper edge of the regenerated cellulose strip may terminate beneath the strip 28, in the form illustrated in Figures 9–11 inclusive the regenerated cellulose extends beyond the strip. If desired, the edges of the regenerated cellulose may be rendered more attractive by scalloping, etc.

The regenerated cellulose, as previously mentioned, may be decorated and secured to the paper in any desired manner. In the preferred embodiment of this form of the invention, the surface of the regenerated cellulose contacting with the paper is provided with decorations (coating or printed indicia) which are formed of a thermoplastic composition and by means of which the regenerated cellulose is adhesively secured to the paper. Any suitable thermoplastic adhesive containing a coloring agent, such as a pigment or dye, may be employed. I have found that the thermoplastic adhesive sold by du Pont as "Thermoplastic cement #4620, Serial No. 56—1346", when admixed with the selected dye or pigment, gives satisfactory results. Another illustrative satisfactory thermoplastic composition which may be used for this purpose is the thermoplastic cement disclosed in United States Patent No. 1,926,918. This thermoplastic cement may also be admixed with any suitable coloring agent, if desired. In the event the regenerated cellulose is not to be decorated, then regenerated cellulose is coated preferably only on that surface thereof which contacts the paper with a transparent composition which is thermoplastic, such as, for example, those previously mentioned without coloring agents or that disclosed in United States Patent No. 1,997,583.

In order to more clearly explain the invention, the process of making the preferred embodiment of the invention illustrated in Figures 9–12 inclusive will now be described.

Referring now to Figure 13, the reference numerals 33 and 34 designate a pair of corrugating rolls through which the materials to be corrugated are passed. The roll 33 is provided with alternate ridges 35 and furrows 36, and the lower roll 34 is provided with alternate ridges 37 and furrows 38. The rolls are so mounted that the corrugations 35 will mesh with the furrows 38 and the furrows 36 will mesh with the ridges 37. The roll 33 is provided adjacent one end thereof with a non-corrugated portion 39 extending around the circumference thereof and which exists as a depression in the roll. The roll 34 is provided with a similar non-corrugated peripheral portion 40 disposed opposite the non-corrugated portion 39. The roll 34 is also provided with a second non-corrugated peripheral portion 41. Both of the corrugating rolls are provided with means (not shown) to maintain them at an elevated temperature for reasons which will become apparent hereafter.

In the operation of the apparatus, the paper base 20 is fed between the rolls whereby it is corrugated. Simultaneously with the feeding of the paper base 20 through the rolls there is also fed a strip of regenerated cellulose 21 properly located with respect to the paper, whereby the two materials are simultaneously corrugated. The under surface of the regenerated cellulose is provided with decorations 42 formed of a thermoplastic adhesive composition. As the materials pass through the roll, the latter by virtue of the elevated temperature activates the thermoplastic composition and causes the materials to be adhesively secured.

Simultaneously with the feeding of the paper 20 and the regenerated cellulose 21, the strips 28, 29 and 30, previously wetted with an appropriate adhesive, are fed through the rolls so that the strips 28 and 29 cooperate with portions 39 and 40 of the rolls, while the strip 30 cooperates with the portion 41 of the roll 34.

The adhesive on the strips 28, 29 and 30 may be of any known type and nature. It may be of the thermoplastic adhesive type, or the aqueous or non-aqueous variety. It may be preapplied or applied while the strips are being fed to the rolls.

It is to be understood that the materials may be laminated and the strips secured in place prior to feeding the same through the corrugating rolls 33 and 34. Likewise, it is not essential that corrugating rolls be used, since any other corrugating means, such as appropriately designed corrugating chains, may be used.

Though in the preferred forms of the invention paper is utilized, it is obvious that any other material capable of receiving a pleat without crushing as, for example, woven or knitted fabric, artificial leather, oilcloth, parchment paper, glassine paper or any of the non-fibrous sheet materials of appropriate thickness, for example, regenerated cellulose, cellulose acetate, glycol cellulose, cellulose ethers, "Bliofilm" casein or other albuminous materials may be used. Likewise, in place of regenerated cellulose, any transparent sheet material such as cellulose acetate, "Pliofilm", cellulose nitrate, casein or other albuminous materials, resins, etc. may be used.

It is to be understood that any of the features of the various embodiments of the invention may be combined as desired.

Since it is obvious that various changes and modifications may be made in the above description without departing from the nature or spirit thereof, this invention is not restricted thereto except as set forth in the appended claims.

I claim:

1. An ornamental edging for shelving comprising a base material having alternate ridges and furrows on both sides thereof, the ridges and furrows on the front being opposite to the furrows and ridges respectively on the back, the ridges on one side being depressed sufficiently to form a groove extending transversely of the base material and said ridges and furrows and without appreciably affecting the ridges on the other side, and a strip in said groove adhesively secured to the said base material.

2. An ornamental edging for shelving comprising a base material having alternate ridges and furrows on both sides thereof, the ridges and furrows on the front being opposite to the furrows and ridges respectively on the back, the ridges on one side being depressed sufficiently to form a groove extending transversely of the base material and said ridges and furrows and without appreciably affecting the ridges on the other side, and a strip in said groove adhesively secured to the said base material, the said groove and strip cooperating to inhibit the normal tendency of the said ridges and furrows to substantially open and flare at the bottom thereof.

3. An ornamental edging for shelving comprising a paper base material having alternate ridges and furrows on both sides thereof, the ridges and furrows on the front being opposite to the furrows and ridges respectively on the back, the ridges on one side being depressed sufficiently to form a groove extending transversely of the base material and said ridges and furrows and without appreciably affecting the ridges on the other side, and a strip in said groove adhesively secured to the said base material.

4. An ornamental edging for shelving comprising a paper base material having alternate ridges and furrows on both sides thereof, the ridges and furrows on the front being opposite to the furrows and ridges respectively on the back, the ridges on one side being depressed sufficiently to form a groove extending transversely of the base material and said ridges and furrows and without appreciably affecting the ridges on the other side, and a strip in said groove adhesively secured to the said base material, the said groove and strip cooperating to inhibit the normal tendency of the said ridges and furrows to substantially open and flare at the bottom thereof.

5. An ornamental edging for shelving comprising a pleated composite material formed of paper laminated to a transparent material, predetermined areas of the surface of the transparent material contacting the paper being provided with an adhesive composition, said composition adhesively securing the paper and transparent material together, and means adhesively secured to the paper to retain the pleats in shape without appreciably affecting the form and shape of the pleats on the other side and to inhibit the normal tendency of the pleats to substantially open and flare at the bottom thereof.

6. An ornamental edging for shelving comprising a pleated composite material formed of paper laminated to a transparent material, predetermined areas of the surface of the transparent material contacting the paper being provided with an adhesive composition, said composition adhesively securing the paper and transparent material together, and a strip of material adhesively secured to the ridges of the paper on the surface opposite to that to which the transparent material is secured to retain the pleats in shape without appreciably affecting the form and shape of the pleats on the other side and to inhibit the normal tendency of the pleats to substantially open and flare at the bottom thereof.

7. An ornamental edging for shelving comprising a pleated composite material formed of paper laminated to a transparent material and having alternate ridges and furrows on both sides thereof, the ridges and furrows on one face being opposite the furrows and ridges respectively on the other side, the surface of the transparent material contacting with the paper having predetermined areas thereof provided with an adhesive composition, said composition adhesively securing the paper and transparent material together, the ridges on the back of the paper being depressed sufficiently to form a groove extending transversely of the material and said ridges and furrows and without appreciably affecting the ridges on the front, and a strip in said groove adhesively secured to said paper.

8. An ornamental edging for shelving comprising a pleated composite material formed of paper laminated to regenerated cellulose, predetermined areas of the surface of the regenerated cellulose contacting the paper being provided with an adhesive composition, said composition adhesively securing the paper and regenerated cellulose together, and means adhesively secured to the paper to retain the pleats in shape without appreciably affecting the form and shape of the pleats on the other side and to inhibit the normal tendency of the pleats to substantially open and flare at the bottom thereof.

9. An ornamental edging for shelving comprsing a pleated composite material formed of paper laminated to regenerated cellulose, predetermined areas of the surface of the regenerated cellulose contacting the paper being provided with an adhesive composition, said composition adhesively securing the paper and regenerated cellulose together, and a strip of material adhesively secured to the ridges of the paper on the surface opposite to that to which the regenerated cellulose is secured to retain the pleats in shape without appreciably affecting the form and shape of the pleats on the other side and to inhibit the normal tendency of the pleats to substantially open and flare at the bottom thereof.

10. An ornamental edging for shelving comprising a pleated composite material formed of paper laminated to regenerated cellulose and having alternate ridges and furrows on both sides thereof, the ridges and furrows on one face being opposite the furrows and ridges respectively on the other side, the surface of the regenerated cellulose contacting with the paper having predetermined areas thereof provided with an adhesive composition, said composition adhesively securing the paper and regenerated cellulose together, the ridges on the back of the paper being depressed sufficiently to form a groove extending transversely of the material and said ridges and furrows and without appreciably affecting the ridges on the front, and a strip in said groove adhesively secured to said paper.

11. A shelving comprising a pleated paper provided with a row of depressed surfaces extending transversely of the pleats to constitute a groove, and a strip adhesively secured in said groove.

12. A shelving comprising a pleated paper provided with oppositely disposed flattened areas on each side of the paper and extending transversely of the pleats to constitute oppositely disposed grooves, and a strip adhesively secured in each of said grooves.

ADOLPH H. COHN.